Figure 1:
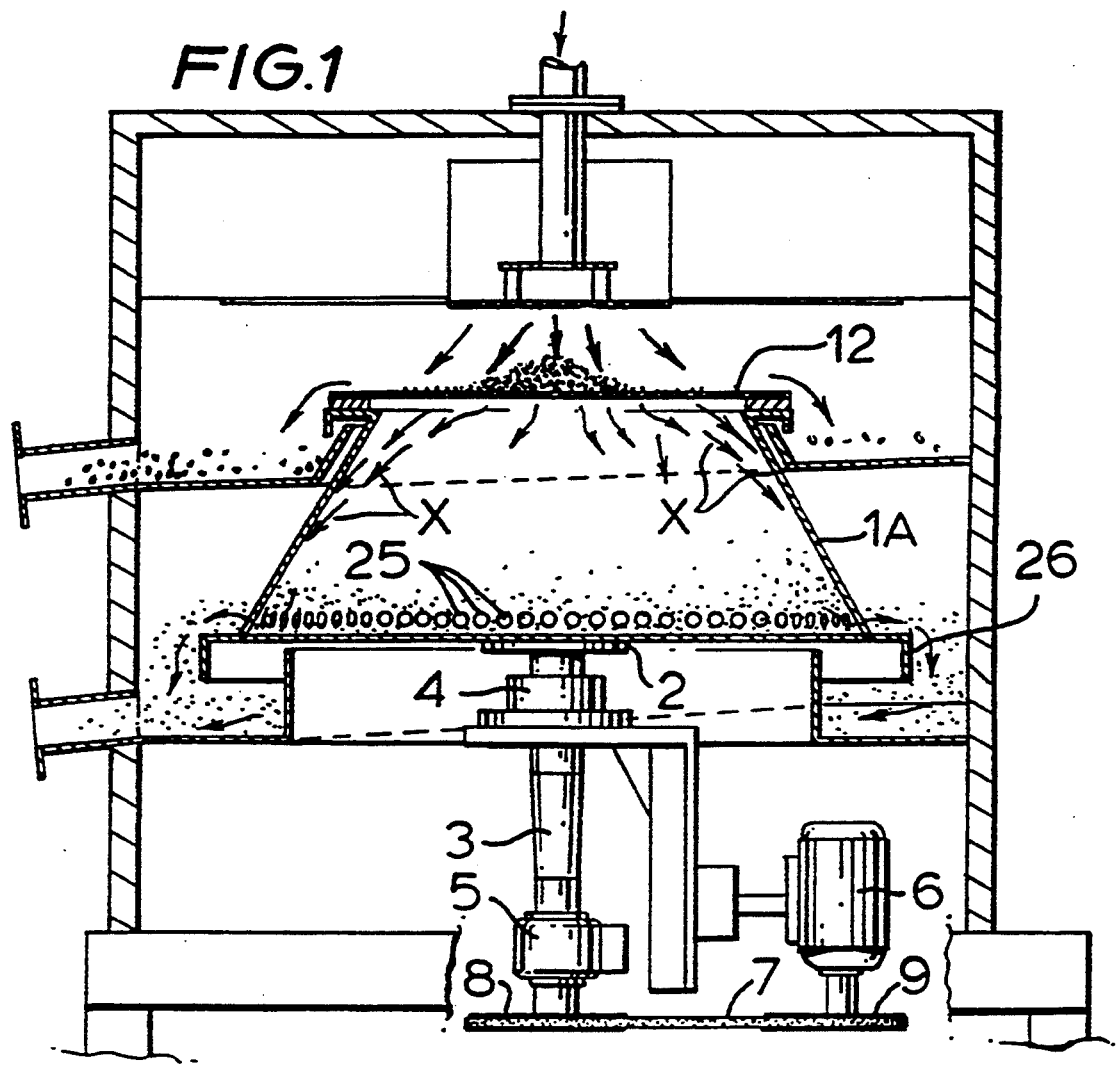

United States Patent [19]
Jones et al.

[11] Patent Number: 5,401,407
[45] Date of Patent: Mar. 28, 1995

[54] ROTARY SCREEN DEVICE

[75] Inventors: Thomas R. Jones; Reginald L. Phillips; Hugh R. Falcon-Steward, all of St. Austell, United Kingdom

[73] Assignee: ECC International Ltd., United Kingdom

[21] Appl. No.: 39,045

[22] PCT Filed: Nov. 28, 1991

[86] PCT No.: PCT/GB91/02107
§ 371 Date: Apr. 7, 1993
§ 102(e) Date: Apr. 7, 1993

[87] PCT Pub. No.: WO92/09375
PCT Pub. Date: Jun. 11, 1992

[30] Foreign Application Priority Data
Nov. 29, 1990 [GB] United Kingdom ............... 9026030

[51] Int. Cl.$^6$ ............................................. B07B 1/08
[52] U.S. Cl. .................................. 210/369; 210/360.1; 210/378; 210/380.1; 210/382; 209/279; 209/288
[58] Field of Search ............... 209/274, 279, 288, 303, 209/350; 210/378, 379, 360.1, 369, 380.1, 380.2, 382

[56] References Cited

U.S. PATENT DOCUMENTS

| | | | |
|---|---|---|---|
| 2,915,181 | 12/1959 | Topp | 209/279 |
| 3,061,095 | 10/1960 | O'Malley | 209/12 |
| 3,547,267 | 12/1970 | Sutherland | 209/240 |
| 4,293,407 | 10/1981 | Locker | 209/279 |
| 4,613,432 | 9/1986 | Racine et al. | 209/254 |

FOREIGN PATENT DOCUMENTS

| | | |
|---|---|---|
| 0411803A1 | 7/1990 | European Pat. Off. |
| 2018677 | 10/1971 | Germany |
| 3138430 | 8/1982 | Germany |
| 4451 | 12/1913 | United Kingdom |
| 1102700 | 2/1968 | United Kingdom |
| WO 90/06396 | 6/1990 | WIPO |
| WO 91/01815 | 2/1991 | WIPO |

OTHER PUBLICATIONS

Packaging Applications of Polytetrafluoroethylene, *PACKAGING*, Mar. 1969, pp. 80–83.

Primary Examiner—Robert A. Dawson
Assistant Examiner—David Reifsynder
Attorney, Agent, or Firm—Parkhurst, Wendel & Rossi

[57] ABSTRACT

Apparatus for continuously separating relatively coarse particles from a suspension of a mixture of particles in a liquid, wherein the suspension is caused to pass through a screening medium which is rotating in its own plane and wherein the screening medium extends over and across the upper end of a rotary drum having generally downwardly depending side walls and wherein the side walls diverge outwardly in a downward direction.

10 Claims, 1 Drawing Sheet

ROTARY SCREEN DEVICE

In our European Patent Application No. 90307994.5, now EPA 0411803A1 published Jun. 1991 there is described an arrangement whereby a suspension of solid particulate material in a liquid is passed through a screen or sieve in order to separate the coarse particles from finer particles within the suspensions.

In that arrangement a screen or sieve is stretched across the upper end of a drum which is rotated about a vertical axis. The fine particulate material passes through the screen into the interior of the drum and is emitted through a series of holes at the lowermost end of the wall of the drum. The sieved particulate material in suspension then passes over a skirt to fall into a launder from where it passes to an outlet.

It has been found that, although the arrangement is generally an improvement on prior forms of screening devices for this type of material, there has been a tendency for the particles in suspension to be flung against the inner surface of the wall of the drum and to cling thereto as they impinge against it. Once a small amount of particles has adhered to the surface of the drum, any other particles tend to adhere to the first and subsequent layers, thus exacerbating the problem. The result has been detrimental to the operation of the screening process and device.

It is an object of this invention to provide an arrangement whereby any particles in suspension which pass through the screening medium and are centrifuged therefrom are prevented from adhering to the inner face of the wall of the drum.

With this in mind it is proposed to form the inner face of the wall of the drum in a frusto-conical shape, with the wall diverging outwardly towards its lower end.

It is found that the particles in suspension when they have passed through the screening medium tend to strike the surface of the wall of the drum at a more acute angle than would be the case had the wall been vertical. Further, there is a tendency for any particles that may have been in contact with the wall to slide downwardly towards the bottom of the wall due to the centrifugal force acting on the particles.

In accordance with the invention there is provided apparatus for continuously separating relatively coarse particles from a suspension of a mixture of particles in a liquid wherein the suspension is caused to pass through a screening medium which is rotating in its own plane and wherein the screening medium extends over and across the upper end of a rotary drum having generally downwardly depending side walls and wherein the side walls diverge outwardly in a downward direction.

The walls may be straight and formed as the frustum of a cone, or they may be formed in a curved section.

The inner surface of the drum wall may be polished or it may be coated with a suitable material which inhibits a tendency for the particles in suspension to stick thereto. The coating may be of polytetrafluoroethylene [PTFE].

Figure 2:
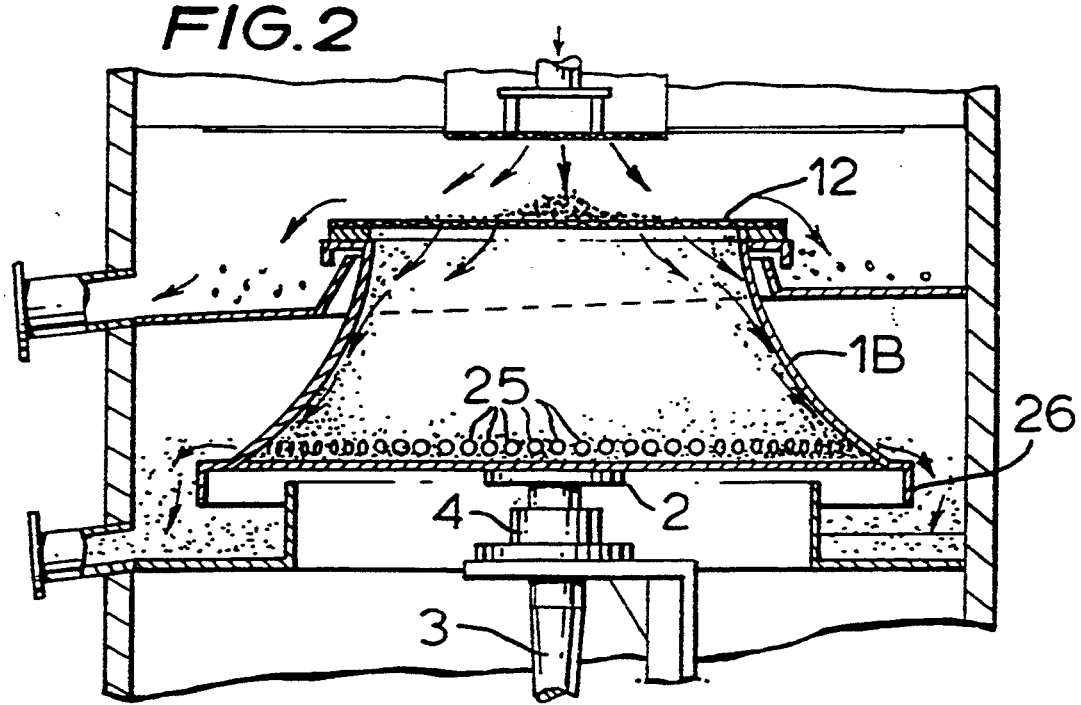

Two illustrative embodiments of the invention will now be described with reference to the accompanying drawings in which:

FIG. 1 is a section view of a rotating screen according to one embodiment of the invention, and FIG. 2 is a view similar to FIG. 1 of a second embodiment.

As in the screening device shown and described in European Patent Application No. 90307994.5, now EPA 0411803A1 published Jun. 1991 there is provided a hollow drum designated as 1A in FIG. 1 of the present application, open at the top and mounted on a boss 2 which is keyed and bolted on to the upper end of the shaft 3 supported in bearings 4 and 5 and rotated by means of an electric motor 6, the drive being transmitted by a belt 7 passing over pulleys 8 and 9.

A circular piece of woven wire mesh screen cloth 12 having a nominal aperture size of 0.053 mm extends across the top of the drum 1A and is removably secured thereto. The walls of the drum depend downwardly where it is closed at its lower end by a skirt member 26. The drum is provided around the lower part of its periphery with a number of holes 25.

In the embodiment seen in FIG. 1 of this application the wall of the drum is formed as a frustum of a cone, diverging towards its lower end where it joins with the lower skirt member 26. Any of the finer particles in suspension in the liquid which are flung radially outwardly as they pass through the screen impinge against the inner face of the wall as indicated by the arrows X in FIG. 1, but tend to strike the surface at an acute angle. This lessens the tendency of the particles to adhere to the wall surface.

Further, the divergance of the walls from top to bottom means that as the drum rotates there is a radial component of force applied to the particles which causes them to slide down the wall and be emitted through the holes 25.

The arrangement is somewhat similar in the second embodiment illustrated in FIG. 2, where the wall of the drum 1B is seen to be curved outwardly from top to bottom.

The same centrifugal effect is present on any particles striking the wall of the drum and causes them to slide down the walls towards the holes 25.

To assist in preventing the adhesion of the particles to the drum, the inner surface of the wall in both embodiments may be highly polished or coated with suitable material, e.g. polytetrafluoroethylene [PTFE].

We claim:

1. An apparatus for separating coarse particles from fine particles in a liquid suspension containing said coarse and fine particles, comprising:
    a screen;
    a hollow drum for receiving the fine particles and liquid which pass through the screen, said drum having a central axis and side walls which define upper and lower ends, said upper end being open and having said screen disposed thereon, said side walls diverging radially outwardly and extending downwardly from said upper end;
    driving means for rotating said drum and screen about said central axis;
    feeding means for feeding the suspension onto said screen; and
    outlet means for passage of the fine particles and the liquid from said drum after passing through said screen, said outlet means comprising a plurality of holes formed in the side walls of the drum and spaced apart along a periphery of the drum.

2. The apparatus of claim 1, wherein said side walls are straight such that said hollow drum frustoconical.

3. The apparatus of claim 1, wherein said side walls are curved.

4. The apparatus of claim 1, wherein said side walls have a polished inner surface.

5. The apparatus of claim 1, further comprising an anti-stick coating applied to an inner surface of said side walls.

6. The apparatus of claim 5, wherein said anti-stick coating is comprised of PTFE.

7. The apparatus of claim 1, wherein said lower end of said drum is closed by a bottom wall.

8. The apparatus of claim 7, wherein said plurality of holes are formed in said side walls adjacent said bottom wall.

9. The apparatus of claim 1, wherein said screen is planar.

10. An apparatus for continuously separating coarse particles from fine particles in a liquid suspension containing said coarse and fine particles, comprising:

a screen;

a hollow drum for receiving the fine particles and liquid which pass through the screen, said drum having a central axis and side walls which define upper and lower ends, said upper end being open and having said screen disposed thereon, said side walls diverging radially outwardly and extending downwardly from said upper end;

driving means for rotating said drum and screen about said central axis;

feeding means for feeding the suspension onto said screen; and outlet means for passage of the fine particles and the liquid from said drum after passing through said screen, said outlet means comprising a plurality of holes formed in the side walls of the drum and spaced apart along a periphery of the drum, said fine particles and liquid being flung radially outwardly by rotation of the drum and the screen so as to impinge upon the side walls of the drum and be subjected to a centrifugal force effected by rotation of the drum, thereby to drive the liquid and fine particles downwardly along said side walls to the outlet means.

* * * * *